March 22, 1960  G. B. WILKES, JR  2,929,546
POSITIONING DEVICE

Filed Jan. 26, 1955  2 Sheets-Sheet 1

Inventor:
Gordon B. Wilkes, Jr.,
by Edward N. Tittle
His Attorney.

March 22, 1960 G. B. WILKES, JR 2,929,546
POSITIONING DEVICE
Filed Jan. 26, 1955 2 Sheets-Sheet 2

Inventor:
Gordon B. Wilkes Jr,
by Edward M. Tittle
His Attorney.

United States Patent Office 2,929,546
Patented Mar. 22, 1960

2,929,546

POSITIONING DEVICE

Gordon B. Wilkes, Jr., Lynnfield Center, Mass., assignor to General Electric Company, a corporation of New York Application January 26, 1955, Serial No. 484,228

15 Claims. (Cl. 230—114)

This invention relates to axial flow compressors and similar apparatus having stator blades or other multiple elements which require simultaneous angular adjustment during operation, and it relates particularly to an improved control and positioning device for such apparatus.

Multistage axial-flow compressors such as those employed on jet engines for aircraft are provided with rows of stator blades for directing the fluid to be compressed into each stage of the compressor rotor. The optimum angle or pitch of the blades differs depending upon the conditions of operation of the compressor, and for the highest efficiency it is necessary to vary the pitch of the stator blades in accordance with changes in operating conditions. For example, greater efficiency at low operating speeds may be secured by proper adjustment of the stator blade angle and the effective speed range of the compressor may be made substantially wider by controlling the angular positioning of the blades in accordance with changes in speed. Various devices have been designed for effecting the required positioning of the stator blades of axial compressors; however, many of these devices are too cumbersome or heavy for satisfactory application to aircraft engines. Some positioning control devices heretofore provided have proved effective for only a relatively narrow load range and others have been subject to errors in operation resulting from expansion and contraction of the compressor casing with changes in ambient temperature. Accordingly, it is an object of this invention to provide a light weight control device for positioning multiple elements such as the stator blades of axial compressors which will effectively and positively control the angular positions of the elements over a wide range of operating conditions.

It is another object of this invention to provide an improved blade positioning device for axial flow compressors and the like including an arrangement for minimizing the effects of changes in ambient temperature on the operation of the device.

Figure 1:
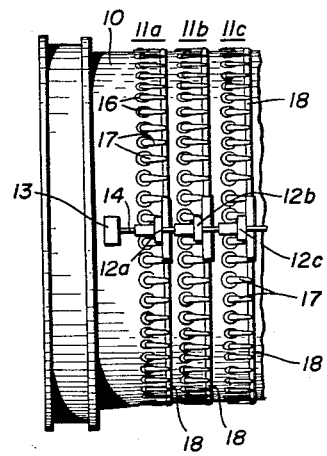
Figure 2:
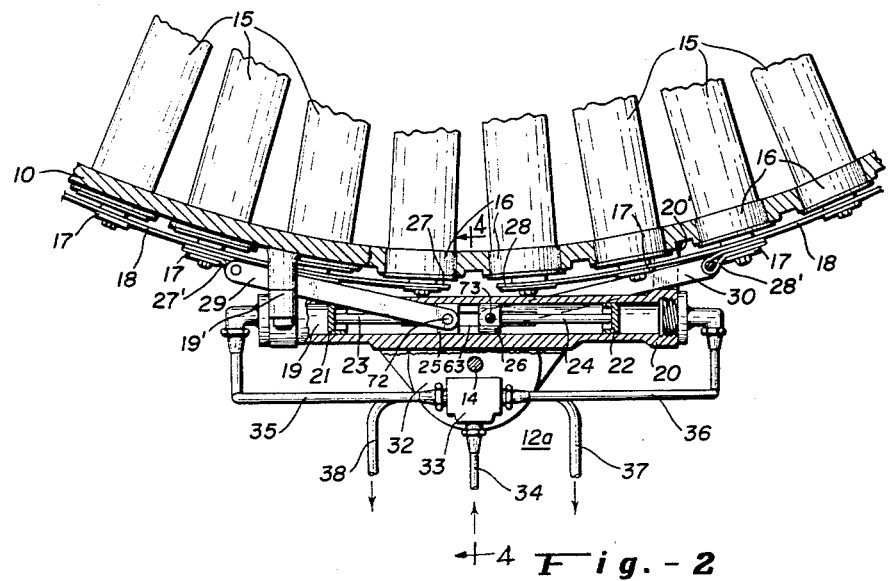
Figure 3:
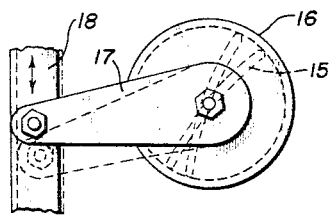
Figure 5:
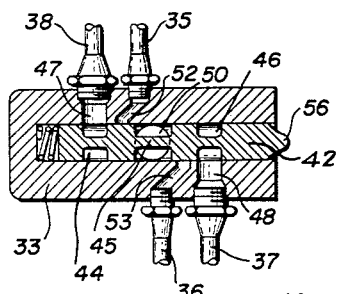
Figure 4:
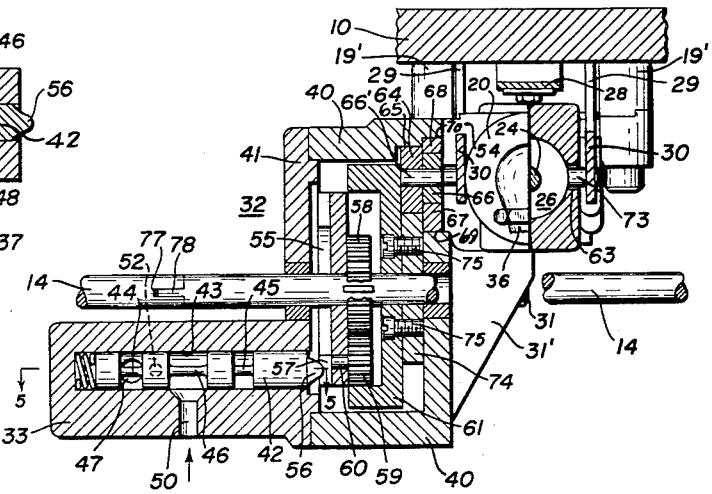
Figure 6:
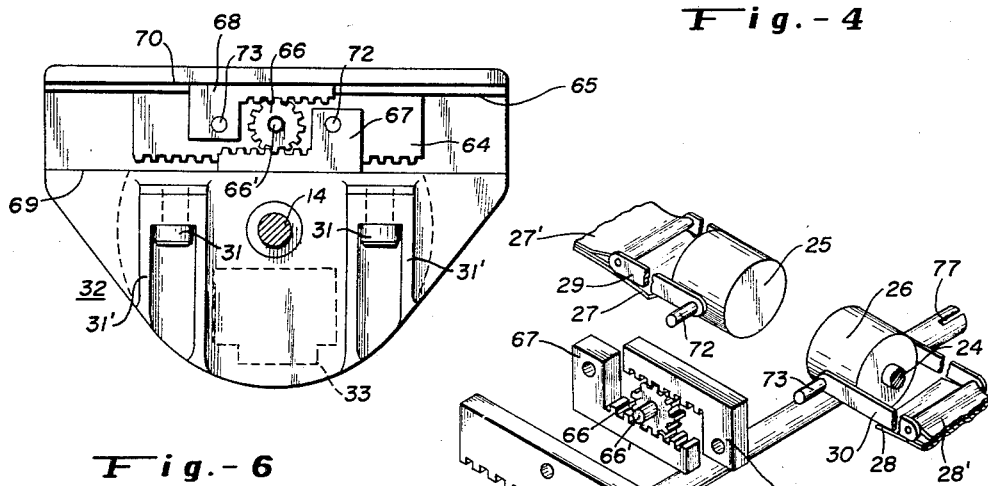
Figure 7:
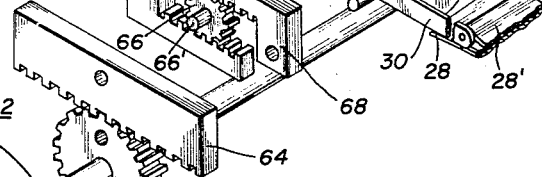
Figure 7:
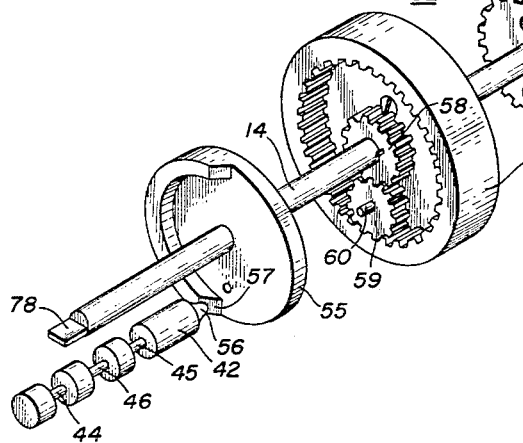

Other objects and advantages will become apparent from the following description taken in connection with the accompanying drawings in which: Fig. 1 is a diagrammatic side elevation view of a portion of an aircraft jet engine provided with a multistage axial-flow compressor and a control embodying the invention; Fig. 2 is an enlarged partial sectional view of the compressor of Fig. 1 showing a control device partly in section and partly broken away; Fig. 3 is an enlarged detail view of one of the blade crank assemblies; Fig. 4 is an enlarged sectional view of the control unit of Figs. 1 and 2 taken along the line 4—4 of Fig. 2 but with a full view of one half of the hydraulic cylinder; Fig. 5 is a sectional view of the control taken along the line 5—5 of Fig. 4; Fig. 6 is an enlarged end view of the control unit with the piston assembly removed; and Fig. 7 is an exploded view of the actuating components of the control.

Briefly, in carrying out the objects of this invention in the illustrated embodiment, a multistage axial-flow compressor is provided with a positioning device to change the angle of all of the stator blades in each row simultaneously. Crank arms are provided for rotating the blades and the arms for each stage are pivotally attached to a flexible split band which surrounds the casing adjacent the blades and is actuated by a hydraulic control unit in accordance with the conditions of operation of the compressor. The hydraulic control unit includes separate pairs of pistons for moving each band, the two pistons for each band are connected to the band near the two ends thereof, and draw the band in opposite directions, only one of the pistons being actuated at a time. The pistons are controlled so that, upon a requirement for a shift in the angular positions of the blades, the piston for moving the band in the required direction will be supplied with fluid under pressure. This control is effected in response to control information transmitted by rotation of a shaft which actuates a gearing for moving the supply control valve. A follow-up mechanism is provided for returning the valve to its neutral position upon movement of the band.

In order to compensate for changes in the diameter of the band which occur on changes in ambient temperature, there is incorporated in the control an arrangement for shifting the band bodily a distance equal to one half the change in spacing of the ends, so that, if one end is held stationary and the other end moves with respect to it, the change in spacing will be distributed evenly over the two halves of the band thereby shifting the blades attached to the two halves of the band in opposite directions. In this manner a plus error is added to one side and a minus error to the other thereby neutralizing the effect of the change in diameter of the band.

In practicing this invention in its broadest aspects, it will occur to those skilled in the art that the constructions and principles about to be disclosed may be embodied in other forms and may be employed in apparatus other than aircraft jet engines.

Referring now to the drawings and particularly to Fig. 1, there is illustrated a portion of an aircraft jet engine having a casing 10 and a multistage axial-flow compressor within the casing. The stator blades of the compressor may be adjusted angularly by positioning control apparatus embodying the present invention, and the blade turning mechanisms for three of the stages are indicated at 11a, 11b, and 11c respectively. The operation of each of the turning mechanisms is controlled by a respective one of three hydraulic actuating devices 12a, 12b, and 12c. A condition responsive control 13 which is actuated in response to an operating characteristic of the compressor, for example, the rotational speed of the impeller shaft, is provided with a shaft 14 which is common to all the devices 12a, 12b, and 12c; thus all the stator blades are positioned in response to the same condition changes. At the inlet side of each stage of the compressor as shown in Fig. 2, there is provided a row of stator blades 15, each of which is rotatably mounted in a cylindrical bearing and packing unit 16; crank arms 17 mounted on the outer end of each bearing unit are provided for adjusting the angular positions of the blades. All the crank arms of each row are pivotally connected at their outer ends to the outer face of a flat flexible split ring or band 18 which extends about the casing 10 and links the stator blades for simultaneous angular movement. The two ends of each band are pivotally secured to the cranks 17 of the two blades on either side of the center line of the respective hydraulic actuators 12a, 12b, and 12c; the ends are spaced, the band being of insufficient length for the ends to meet; the gap thus provided allows the ends to move freely with respect to one another upon expansion and contraction of the casing and changes in diameter of the band which result from changes in ambient temperature. The arms 17 are thin and flat so that they may flex toward and away from the casing and may twist about their longitudinal axes when they are rotated by the band 18; this construction affords easy angular movement of the cranks over a wide range without requiring universal pivot connections between the cranks and the bands. The thin flexible band 18 and the thin flat arms 17 make possible a compact, light-weight assembly which is particularly desirable for aircraft engines.

Each of the hydraulic actuators 12a, 12b, and 12c includes two cylinders having pistons each attached to the band near a respective end thereof and being arranged to pull the band around the casing. The general construction and arrangement of the hydraulic mechanisms is shown in Fig. 2 which is an enlarged view of the device 12a, the other devices 12b and 12c being of the same construction. The mechanism includes a cylinder block or housing providing two opposed hydraulic cylinders 19 and 20 mounted in alignment with the band 18 on supporting brackets 19' and 20' attached to the casing. The common axis of the cylinders lies substantially tangential to the casing 10; the cylinders have pistons 21 and 22, respectively, connected to move the band in opposite directions about the casing. The connections between the pistons and the bands include rods 23 and 24 and guide blocks 25 and 26 which are attached to loops 27' and 28' near the spaced ends 27 and 28 of the band 18 by pivoted links 29 and 30. Admission of fluid under pressure to actuate the pistons is controlled in a manner to be described later so that when fluid is admitted to one of the cylinders, the other cylinder is opened to the drain connection; thus one end of the band 18 is moved to pull the band around the casing while the other end is free to move. When the valve mechanism has been shut off, the cylinder which has received fluid under pressure is sealed and the end of the band attached to the piston in that cylinder is thus locked in position. Referring again to Fig. 2, when fluid under pressure is admitted to the cylinder 19, the piston 21 moves to the right and draws the end 27 of the band with it to rotate the band counterclockwise as viewed in Fig. 2; similarly when fluid is admitted to the cylinder 20, the piston 22 moves the band 18 clockwise about the casing. Thus the band may be moved in either direction by selecting the piston to be actuated and the crank arms are then turned to rotate the stator blades and shift their angular positions. By changing the angular positions of the blades in accordance with the operating conditions of the compressor, the efficiency of the compressor may be maintained high throughout a wide range of operating conditions.

A control device 32 is secured to the cylinder block by bolts 31 mounted in brackets 31' on the wall of the device and which provide a seat for the cylinder block. Fluid under pressure is admitted to the cylinders 19 and 20 by operation of the control device 32 in response to rotation of the information transmitting shaft 14. The control device 32 includes a slide valve mounted in a housing 33, the valve being slidable along a path parallel to the control shaft 14 and being connected to control the admission of fluid pressure to the cylinders 19 and 20. In its middle or neutral position, the valve closes the ports to both cylinders 19 and 20; in one extreme position the valve connects a fluid pressure supply pipe 34 to the cylinder 19 through a supply pipe 35 and connects a supply pipe 36 of the cylinder 20 to a drain connection 37; in its opposite position, the valve in the housing 33 connects the fluid supply pipe 34 to supply fluid to the cylinder 20 through the pipe 36 and connects the cylinder 19 to a drain pipe 38. It will thus be apparent that the direction and amount of movement of the band may be determined by controlling the valve of the device 32 to move one or the other of the pistons 21 and 22 the distance necessary to secure the required angular adjustment of the stator blades. The manner in which the control device 32 operates will be more readily understood by a reference to Figs. 4, 5, and 6.

As shown in Figs. 4, 5, and 6, the device 32 comprises a housing constructed in two parts 40 and 41, the portion 40 carrying the brackets 31' and the portion 41 comprising the end plate of which the valve housing 33 is an integral part. The valve within the housing 33 is a three-way valve including a piston or slide 42 which moves parallel to the shaft 14 in a bore 43. The slide 42 includes three reduced portions forming passages 44, 45, and 46, and in its neutral position in which it is illustrated the outer two passages 44 and 45 lie in registry with two discharge or drain ports 47 and 48 which are connected in communication with the drain pipes 37 and 38, respectively, on opposite sides of the housing 33. The central valve passage 46 in the neutral position registers with a fluid pressure inlet port 50 which is in direct communication with the supply pipe 34. In the block 33 as shown in Figs. 4 and 5, two ports 52 and 53 opening through opposite sides of the housing 33 are located axially of the valve bore on either side of the central port 50 and are located so that when the slide is in its neutral position as shown both ports 52 and 53 are closed. Ports 52 and 53 communicate through the pipes 35 and 36 with the cylinders 19 and 20 respectively. It will now be evident that when the valve 42 is moved to the right it will connect the port 53 with the pressure fluid supply port 50 and at the same time will connect the port 52 with the drain port 47; thus fluid under pressure will be supplied to the cylinder 20 and the cylinder 19 will be connected to the drain so that the end 28 of the band 18 will be moved to the left and the band will rotate about the casing moving the band 27 to the left and thereby moving the piston 21 to the left and discharging fluid from the cylinder 19 through the drain pipe 35. In the reverse position of the slide 42, fluid under pressure will be supplied through the port 52 to the cylinder 19 and the cylinder 20 will be connected to the drain through the port 53 and the drain port 48 and pipe 37.

The movement of the slide 42 is controlled by operation of a cam disc 55, rotatably mounted on the shaft 14, the configuration of the disc is more clearly shown in Fig. 7. In the normal or neutral position of the valve a cam follower 56 formed at the end of the slide 42 rests on the midpoint of a sloping cam surface 57 of the disc; thus when the disc 55 is rotated clockwise as viewed in Fig. 7, the slide 42 moves to the right as the cam surface 57 moves away and when the cam disc is rotated in the opposite direction the cam portion 57 forces the slide to move to the left. The disc 55 is connected to be operated upon rotation of the control shaft 14 through an input gear 58 keyed to the shaft 14 and a planet gear 59 rotatably mounted on the disc 55 on a stub shaft 60 and meshing with the gear 58 and an internal ring gear 61; this latter gear is normally stationary and rotates only when the band moves. Thus when the gear 58 is rotated, the planet gear 59 will roll between the gear 58 and the gear 61 and will rotate the cam disc 55, thereby moving the valve slide 42 to the right or left depending upon the direction of rotation of the cam surface 57.

A follow-up mechanism is provided to restore the valve slide 42 to its neutral position when the band 18 has been moved the amount required by the rotation of the shaft 14. The follow-up mechanism is arranged to rotate the ring gear 61 in a direction to effect opposite movement of the planet gear 59 to that produced by rotation of the shaft 14. Thus, the follow-up mechanism rotates the cam disc 55 in a direction opposite to that effected by the shaft 14 and restores the valve slide 42 to its neutral position. The follow-up mechanism includes a rack 64 slidably mounted on a guide track 65 for straight line movement in a plane normal to the control shaft 14. A pinion gear 66 is rotatably mounted on a stub shaft 66' on the rack 64 and engages two L-shaped racks 67 and 68 which are movable on guides or tracks 69 and 70 parallel to the guide 65 of the rack 64. The racks are retained in position laterally by a lug or spacing member 54 formed on the cylinder block at the center above the paths of the links 29 and 30 and which lies in face engagement with the rack 68 and the top of the rack 67. The racks 67 and 68 are secured by pins 72 and 73 to the guide blocks 25 and 26, respectively, as shown in Fig. 7; the pins are the pivotal mountings for the ends of the links 29 and 30 and pass through longitudinal slots 63 provided in the sides of the cylinder block. When the band 18 is rotated by operation of one of the pistons 21 and 22, the two ends 27 and 28 of the band move simultaneously and in the same direction and the guide blocks 25 and 26 also move simultaneously and in the same direction so that the racks 67 and 68 move in the same direction for the same distance and the pinion 66 is not rotated. Thus the rack 64 is moved the same amount as the racks 67 and 68. The rack 64 is arranged to drive the ring gear 61 through a gear 74 which is concentric with the ring gear and is attached thereto by machine screws 75. The ring gear 61 is mounted for free rotation about the shaft 14 and thus on movement of the rack 64 is rotated about the shaft so that the planet gear 59 rolls between the ring gear and the gear 58 keyed to the shaft 14. In this manner the follow-up mechanism moves the cam 55 a distance determined by the amount of movement of the band 18 and restores the slide valve 42 to its neutral position after the band has moved the amount required by the movement of the condition responsive control shaft 14.

The operation of the information transmitting shaft 14 is not affected by changes of load on the compressor and varying forces exerted against the stator blades. The system thus provides for automatic positioning of the blades of one or a plurality of stages in accordance with intellligence transmitted by a single control rod.

During the operation of the compressor, changes in ambient temperature will cause the casing 10 to expand or contract and the split band 18 will accommodate itself to these changes by a change in diameter and consequent change in the spacing of the ends of the band. One end of the band is always locked during the operation of the compressor because fluid is retained in the actuated cylinder upon closing of the cotnrol valve. Thus, whenever there is a change in the spacing of the ends of the bands due to expansion or contraction of the casing 10, or for any other reason, there will result a shifting of all the stator blades connected to the band and the shift will take place cumulatively from the stationary end of the band to the moving end thereof. Thus the movement of the band will change the position of the stator blades linked to the portion of the band near the moving end more than the portions near the stationary end. It is the function of the rack assembly, including the L-shaped racks 67 and 68 and the pinion 66 for driving the rack 64, to neutralize the effect of changes in spacing of the two ends of the band. The manner in which this compensating device operates will be apparent from the consideration of the exploded view, Fig. 7. Assuming that the slide valve 42 is in its neutral position and that fluid under pressure has been supplied to the cylinder 22 and is thus retained therein, the guide block 26 will be locked in position and will hold the end 28 stationary. If, on a rise of ambient temperature, the casing 10 now expands, the gap between the two ends of the band 18 will widen and the guide block 25 will move away from the guide block 26. Because the rack 68 is locked in position, the movement of the guide block 25 will move the rack 67 away from the rack 68 and rotate the pinion 66, the shaft 66' of which will move a distance equal to one half the change in the gap between the two ends of the band.

The rack 64 will thus move a distance equal to one half the change in spacing of the ends of the band and will rotate the gear 74 and hence the ring gear 61 counterclockwise as viewed in Fig. 7, thereby rotating the cam disc 55 counterclockwise and moving the slide valve 42 to the left; this connects the fluid pressure supply through the ports 50 and 52 to the pipe 35 and supplies fluid under pressure to the cylinder 19. The band then moves toward the right as viewed in Fig. 7 so that the follow-up action wherein the two L-shaped racks 67 and 68 and the rack 64 move equally in the same direction is effective to rotate the gears 74 and 61 clockwise and restore the cam 55 to its position for closing the valve 42. This operation moves the entire band a distance equal to one half the change in spacing and as a result the pair of blades diametrically opposite the midpoint between the ends of the band will be positioned correctly in accordance with the setting of the control shaft 14 and the remaining error will be divided between the two halves of the band, one half of the band having its connected blades positioned with a plus error and the other half having its connected blades positioned with a minus error. The overall result is to neutralize the effect of the change in spacing of the ends with changes in ambient temperature. The operation of the mechanism to effect compensation in the event that the end 25 is the stationary end at the time of the change in ambient temperature is essentially the same as that when the end 26 is stationary, the shift, of course, being in the opposite direction. The operation of the mechanism upon a reduction of the spacing of the ends and the direction of shift of the band are essentially the same but opposite in direction to those occurring on expansion of the casing.

Summarizing the foregoing, it will now be apparent that during the operation of the aircraft jet engine, assuming by way of example that the control 13 is actuated in response to changes in the speed of the compressor rotor, the stator blades 15 of all stages, including the stages 11a, 11b, and 11c indicated on the drawing, will be positioned to secure maximum efficiency for all operating speed. Upon a change of speed, the intelligence transmitting shaft 14 will turn and each row of stator blades will be shifted in position simultaneously, the change of pitch of the blades in each row depending upon the gear ratios of the input and follow-up gear trains in its respective hydraulic control device. Should there be a change in ambient temperature resulting in expansion or contraction of the casing 10 of the compressor, the spacing of the ends 27 and 28 of the bands 18 will change and the hydraulic mechanisms will operate to distribute the change in spacing equally between the two halves of each of the bands, thereby neutralizing the effect of the expansion or contraction of the casing. The operation thus is fully automatic and maintains the stator blades of all stages at all times in their optimum pitch positions.

The shaft 14 has been illustrated as made in sections each having a slot 77 at one end and a tongue 78 at the other so that the separate sections rotate together but may move axially with respect to one another. Because the several hydraulic mechanisms and controls 12a, 12b, and 12c are arranged in alignment parallel to the axis of rotation of the compressor and parallel to the shaft 14, the cam and gears may move longitudinally of the shaft without affecting the operation of the control, and the several controls will continue to operate in response to rotation of the shaft 14 without requiring adjustment or compensation upon the occurrence of longitudinal expansion of the compressor casing.

The servicing of the hydraulic mechanisms is simplified because they are identical for all stages, except that different racks and gears are employed to secure different gear ratios; adjustment of the position of one band with respect to another may be accomplished by changing the gear ratios in the input and follow-up trains and, thus, it is not necessary to adjust any power-carrying linkages.

While the invention has been described in connection with a specific form applied to an aircraft jet engine, various other applications and embodiments will occur to those skilled in the art; therefore, it is not desired that the invention be limited to the specific construction illustrated, and it is intended by the appended claims to cover all modifications which fall within the spirit and scope of the invention.

I claim:

1. In an axial-flow compressor or the like having a casing and a row of adjustable pitch stator blades mounted in said casing, a blade positioning device comprising connecting means including a split band surrounding said casing adjacent said blades and supported to move circumferentially thereof for adjusting the pitch of said blades simultaneously, motor means including two independent driving members each connected to said band near a respective end thereof for rotating said band about said casing in opposite directions to effect opposite changes in the pitch of said blades, means including a control element movable from a neutral position to either of two motor energizing positions for actuating said driving members alternatively, means responsive to a condition of operation of said compressor for moving said control element to a corresponding one of said energizing positions, and means dependent upon the resulting movement of said band for restoring said control element to its neutral position.

2. A blade positioning device for an axial-flow compressor or the like in accordance with claim 1, including crank arms flexible transversely of said band for rotating said blades about their longitudinal axes, and means pivotally connecting said crank arms and said band for supporting said band in spaced relationship to said casing.

3. A blade positioning device for an axial-flow compressor or the like in accordance with claim 1, wherein said actuating means is arranged to maintain the last actuated driving member locked while said control element is in its neutral position, and including means responsive to movement of the free end of said band with respect to the locked end for operating said control element to effect a movement of said band equal to one half of the initial movement of the free end and in a direction to space the ends of said band equally with respect to their positions prior to the initial movement of the free end.

4. In an axial-flow compressor or the like having a casing and a row of adjustable pitch stator blades mounted in said casing, a blade positioning device comprising connecting means including a split band surrounding said casing adjacent said blades and supported to move circumferentially thereof for adjusting the pitch of said blades simultaneously, hydraulic motor means including two cylinders having independent hydraulic pistons each connected to said band near a respective end thereof for rotating said band about said casing in opposite directions to effect opposite changes in the pitch of said blades, valve means movable from a neutral position to either of two pressure fluid supply positions for actuating said pistons alternatively, said valve means in its neutral position preventing escape of pressure fluid from said motor means whereby the last piston to be actuated is maintained locked in position, means responsive to a condition of operation of said compressor for moving said valve means to a corresponding one of said supply positions, means dependent upon the resulting movement of said band for restoring said valve means to its neutral position, and means responsive to movement of the free end of said band with respect to the end connected to the locked piston for actuating said valve means to effect a movement of said band equal to one half of the relative movement between said ends and in a direction to space the ends of said bands equally with respect to their positions prior to the initial movement of the free end.

5. In an axial-flow compressor or the like having a casing and a row of adjustable pitch stator blades mounted in said casing, a blade positioning device comprising connecting means including a split band surrounding said casing adjacent said blades and supported to move circumferentially thereof for adjusting the pitch of said blades simultaneously, motor means including two driving members each connected to said band near a respective end thereof for alternatively rotating said band about said casing in opposite directions to effect opposite changes in the pitch of said blades, control means movable from a neutral position to either of two motor energizing positions for actuating said driving members alternatively, condition responsive means for actuating said control means, said condition responsive means including a rotatable control shaft, a cam rotatably mounted on said shaft for actuating said control means, a planet gear rotatably mounted on said cam eccentrically thereof, a pinion gear mounted on said shaft for rotation therewith and engaging said planet gear, an internal ring gear rotatably mounted on said shaft and engaging said planet gear, said ring gear being normally stationary whereby movement of said shaft is transmitted to said cam through said planet gear and means connecting said band and said ring gear for rotating said ring gear upon movement of said band to restore said cam to its neutral position.

6. In an axial-flow compressor or the like having a casing and a row of adjustable pitch stator blades mounted in said casing, a blade positioning device in accordance with claim 5 wherein said connecting means includes a pinion attached to and concentric with said ring gear and a rack engaging said pinion and connected for movement with said band.

7. In an axial-flow compressor or the like having a casing and a row of adjustable pitch stator blades mounted in said casing, a blade positioning device in accordance with claim 5 wherein said last mentioned means includes means dependent upon movement of one of said ends away from the other and comprising a pair of racks one connected to move with each end of said band and a pinion gear between and in alignment with both said racks for effecting a movement of said band equal to one half the change in spacing of the ends and in a direction to position said ends equidistantly from their positions prior to their relative movement.

8. In an axial-flow compressor or the like having a casing and a row of adjustable pitch stator blades mounted in said casing, a blade positioning device comprising connecting means including a split band surrounding said casing adjacent said blades and supported to move circumferentially thereof for adjusting the pitch of the blades simultaneously, motor means including two cylinders having pistons therein each connected to said band near a respective end thereof for alternatively rotating said band about said casing in opposite directions to effect opposite changes in the pitch of said blades, valve means comprising an elongated slide valve mounted parallel to the axis of said compressor and movable from a neutral position to either of two pressure fluid supply positions for actuating said pistons alternatively, condition responsive means including a rotatable control shaft mounted parallel to said slide valve, a cam rotatably mounted on said shaft and having a surface sloping axially with respect to said shaft for actuating said slide valve, a planet gear rotatably mounted on said cam eccentrically thereof, a pinion gear mounted on said shaft for rotation therewith and engaging said planet gear, an internal ring gear rotatably mounted on said shaft and engaging said planet gear, said ring gear being normally stationary whereby movement of said shaft is transmitted to said cam through said planet gear, and means connecting said band and said ring gear for rotating said ring gear upon movement of said band to restore said cam to its neutral position.

9. In an axial-flow compressor or the like having a casing and a row of adjustable pitch stator blades mounted in said casing, a blade positioning device comprising connecting means including a flexible split band surrounding and supported to move circumferentially of said casing adjacent said blades for adjusting the pitch of said blades simultaneously, the ends of said split ring being spaced from one another and being subject to changes in spacing with changes in temperature, hydraulic motor means including two cylinders having pistons therein each connected to said band near a respective one of said ends for alternatively rotating said band about said casing in opposite directions to effect opposite changes in the pitch of said blades, valve means movable from a neutral position to either of two pressure fluid supply positions for actuating said pistons alternatively, condition responsive means for actuating said valve means, said condition responsive means including a rotatable control shaft, a cam rotatably mounted on said shaft for actuating said valve means, a planet gear rotatably mounted on said cam eccentrically thereof, a pinion gear mounted on said shaft for rotation therewith and engaging said planet gear, an internal ring gear rotatably mounted on said shaft and engaging said planet gear, said ring gear being normally stationary whereby movement of said shaft is transmitted to said cam by said planet gear, means connecting said band and said ring gear for rotating said ring gear upon bodily movement of said band to restore said cam to its neutral position, siad connecting means also including means effective upon movement of one of said ends away from the other for moving said band one half the distance of such movement to distribute the change in spacing of said ends equally between the two halves of said band.

10. In an axial-flow compressor or the like having a casing and a row of adjustable pitch stator blades mounted in said casing, a blade positioning device in accordance with claim 9 wherein said means for connecting said band and said ring gear comprises a drive gear secured to said ring gear and concentric therewith, a rack slidably mounted for movement transversely of said shaft and engaging said drive gear, a pinion gear rotatably mounted on said rack, and a pair of racks each connected for movement with a respective one of the ends of said band, said pair of racks being slidably mounted for movement parallel to said first rack and engaging opposite sides of said pinion on said first rack.

11. A position controlling device comprising a split flexible band having its ends spaced from one another and normally movable together, a pair of hydraulic cylinders having independent pistons each connected to a respective one of said ends, valve means movable from a neutral position to either of two actuating positions for alternatively supplying hydraulic fluid under pressure to said cylinders to move said band in opposite directions, a control shaft, a cam rotatably mounted on said shaft for actuating said valve means, a first gear on said shaft secured for rotation therewith, a planet gear rotatably mounted on said cam eccentrically thereof and engaging said first gear, an internal ring gear rotatably mounted on said shaft and engaging said planet gear whereby movement of said first gear while said ring gear is stationary rotates said planet gear to actuate said cam, and means connecting said ends of said band and said ring gear for utilizing the movement of said band to rotate said ring gear and drive said cam to restore said valve means to its neutral position.

12. In a mechanical control apparatus including a circular split flexible band supported for rotary movement about its axis and having its ends spaced from one another and normally movable together but subject to change in spacing due to temperature changes, a position controlling device comprising a pair of hydraulic cylinders having independent pistons each connected to a respective one of said ends, valve means movable from a neutral position to either of two actuating positions for alternatively supplying hydraulic fluid under pressure to said cylinders to move said band in opposite directions, a control shaft, a cam rotatably mounted on said shaft for actuating said valve means, a first gear on said shaft secured for rotation therewith, a planet gear rotatably mounted on said cam eccentrically thereof and engaging said first gear, an internal ring gear rotatably mounted on said shaft and engaging said planet gear whereby movement of said first gear while said ring gear is stationary rotates said planet gear to actuate said cam, means connecting said ends of said band and said ring gear for utilizing the movement of said band to rotate said ring gear and drive said cam to restore said valve means to its neutral position, said valve means in its neutral position preventing the escape of fluid from the actuated cylinder to substantially lock the respective one of said ends in position, said connecting means also including means dependent upon movement of the other of said ends away from the locked end to rotate said ring gear and actuate said valve means to effect a bodily movement of said band equal to one half the change in spacing of said ends.

13. A position controlling device, in accordance with claim 12, wherein said connecting means comprises a drive gear secured to and concentric with said ring gear, a first rack movable in a plane normal to said shaft and engaging said drive gear, a pinion gear rotatably mounted on said rack, second and third parallel racks attached to respective ones of said ends and movable in a plane parallel to said first rack, said second and third racks engaging opposite sides of said pinion gear whereby when one of said ends is stationary movement of the other end effects a movement of said first rack equal to one half the change in spacing of said ends whereby said cam is moved to actuate said valve means and shift said band a distance equal to one half the change in spacing of said ends.

14. In a mechanical control apparatus including a circular split flexible band supported for movement about its axis and having its ends spaced from one another and normally movable together but subject to changes in spacing upon changes in temperature, a position controlling device comprising a pair of hydraulic cylinders having independent pistons each connected to a respective one of said ends, valve means movable from a neutral position to either of two actuating positions for alternatively supplying hydraulic fluid under pressure to said cylinders to move said band in opposite directions, follow-up means dependent upon the movement of said band for restoring said valve means to its neutral position, said valve means in its neutral position maintaining the actuated one of said pistons substantially locked to lock the respective end, and said follow-up means including means dependent upon movement of the free end of said band with respect to the locked end for actuating said valve means to shift said band and distribute the change in spacing of the said ends equally with respect to their position prior to movement of the free end.

15. In an axial-flow compressor or the like having a cylindrical casing and a plurality of rows of adjustable pitch stator blades mounted in said casing, separate blade positioning devices for each of said rows of blades, each of said devices comprising a split band surrounding said casing and supported for movement about said casing adjacent its respective row of blades, means connecting each of said bands to the blades in its respective row for adjusting the pitch of the blades of each row simultaneously, a common condition responsive rotatable control shaft extending parallel to the axis of said bands, separate motor means for actuating each of said bands in response to rotation of said shaft, each of said motor means including two actuating members each connected to its associated band near a respective end thereof for alternatively moving the band about said casing in opposite directions to effect opposite changes in the pitch of the blades of the respective row, control valve means movable from a neutral position to either of two motor energizing positions for actuating said members alternatively, a cam rotatably mounted on said shaft for actuating said control valve means, a planet gear rotatably mounted on said cam eccentrically thereof, a pinion gear mounted on said shaft for rotation therewith and engaging said planet gear, an internal ring gear rotatably mounted on said shaft and engaging said planet gear, said ring gear being normally stationary whereby movement of said shaft is transmitted to said cam through said planet gear, and means connecting the respective band and said ring gear for rotating said ring gear upon movement of the band to restore said cam to its neutral position.

References Cited in the file of this patent

UNITED STATES PATENTS

| | | |
|---|---|---|
| 2,460,778 | Willgoos | Feb. 1, 1949 |
| 2,500,070 | Hagen | Mar. 7, 1950 |